US009636579B2

(12) United States Patent
Mercier et al.

(10) Patent No.: US 9,636,579 B2
(45) Date of Patent: *May 2, 2017

(54) PORTABLE GAMING AND ENTERTAINMENT SYSTEM

(71) Applicant: G.A.E.M.S., Inc., Redmond, WA (US)

(72) Inventors: Dean T. Mercier, Bellevue, WA (US); Parker Chou, Seattle, WA (US); Ryan Moore, Seattle, WA (US)

(73) Assignee: G.A.E.M.S., Inc., Bothell, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/132,012

(22) Filed: Apr. 18, 2016

(65) Prior Publication Data

US 2016/0228768 A1    Aug. 11, 2016

Related U.S. Application Data

(63) Continuation of application No. 13/902,673, filed on May 24, 2013, now Pat. No. 9,333,423, which is a
(Continued)

(51) Int. Cl.
*A63F 13/26* (2014.01)
*A63F 13/98* (2014.01)
(Continued)

(52) U.S. Cl.
CPC .............. *A63F 13/26* (2014.09); *A63F 13/08* (2013.01); *A63F 13/24* (2014.09); *A63F 13/98* (2014.09)

(58) Field of Classification Search
CPC .......... A63F 13/08; A63F 13/90; A63F 13/98; A63F 13/24; A63F 13/26
See application file for complete search history.

(56) References Cited

U.S. PATENT DOCUMENTS

| 5,894,914 A | 4/1999 | Jubin |
| 6,073,770 A * | 6/2000 | Park .................... A45C 13/021 |
| | | 206/320 |

(Continued)

FOREIGN PATENT DOCUMENTS

| CN | 1501768 A | 6/2004 |
| CN | 1638666 A | 7/2005 |

OTHER PUBLICATIONS

Chinese First Office Action, Chinese Application No. 201110332258.8, Jun. 3, 2015, 8 pages.
(Continued)

*Primary Examiner* — Jasson Yoo
(74) *Attorney, Agent, or Firm* — Fenwick & West LLP

(57) ABSTRACT

A portable gaming and entertainment system (or "environment") for use with a game console and related components that allows the user thereof to easily, safely and conveniently transport the system. The system comprises a case having a lid pivotally attached to a base. One or more custom inserts are provided to securely receive the game console therein. The custom inserts permit the system to be usable with a variety of supported game consoles. The lid includes a monitor and speakers, and is operative to be opened and maintained at a position to provide a desirable viewing angle for a user. The lid closes against the base to enclose the game console and other related components so that the user may easily transport and/or store the system.

22 Claims, 10 Drawing Sheets

Related U.S. Application Data continuation of application No. 12/985,279, filed on Jan. 5, 2011, now abandoned.

(51) Int. Cl.
   *A63F 13/24* (2014.01)
   *A63F 13/90* (2014.01)

(56) References Cited

U.S. PATENT DOCUMENTS

| | | | |
|---|---|---|---|
| 6,145,661 A | 11/2000 | Jung | |
| 9,333,423 B2* | 5/2016 | Mercier | A63F 13/24 |
| 2002/0066683 A1* | 6/2002 | Sanders, Jr. | B65D 5/6664 |
| | | | 206/320 |
| 2003/0010664 A1* | 1/2003 | Bellin | G11B 33/0438 |
| | | | 206/425 |
| 2003/0217940 A1* | 11/2003 | Russell | A45C 3/02 |
| | | | 206/320 |
| 2004/0048672 A1 | 3/2004 | Hussaini et al. | |
| 2004/0048674 A1 | 3/2004 | Hussaini et al. | |
| 2005/0057910 A1 | 3/2005 | Schnurr | |
| 2005/0145528 A1* | 7/2005 | Matias | A45C 13/02 |
| | | | 206/521 |
| 2005/0176508 A1 | 8/2005 | Chastain | |
| 2005/0185916 A1 | 8/2005 | Jost et al. | |
| 2005/0250583 A1* | 11/2005 | White | A63F 13/90 |
| | | | 463/47 |
| 2009/0009945 A1* | 1/2009 | Johnson | G06F 1/1613 |
| | | | 361/679.27 |
| 2010/0102777 A1 | 4/2010 | Sa | |
| 2011/0092294 A1* | 4/2011 | Mercier | A63F 13/90 |
| | | | 463/46 |

OTHER PUBLICATIONS

Chinese Second Office Action, Chinese Application No. 201110332258.8, Jan. 27, 2016, 7 pages.
United States Office Action, U.S. Appl. No. 13/902,673, Jun. 17, 2015, 22 pages.
United States Office Action, U.S. Appl. No. 13/902,673, Oct. 2, 2014, 16 pages.
United States Office Action, U.S. Appl. No. 12/985,279, Jan. 24, 2013, 17 pages.
United States Office Action, U.S. Appl. No. 12/985,279, Mar. 19, 2012, 14 pages.

* cited by examiner

PORTABLE GAMING AND ENTERTAINMENT SYSTEM

CROSS REFERENCE TO RELATED APPLICATIONS

This application claims priority to and is a continuation of U.S. application Ser. No. 13/902,673, filed on May 24, 2013, which is a continuation of U.S. application Ser. No. 12/985,279, filed Jan. 5, 2011, the contents of which are incorporated herein by reference in their entirety.

BACKGROUND

Field

The field of present invention relates generally to the field of custom portable gaming and entertainment environments. In particular, the present invention relates to a gaming and entertainment system that is configured with an audio output, high definition display, and a video gaming console and storage.

Related Art

The following description includes information that may be useful in understanding the present invention. It is not an admission that any of the information provided herein is prior art or relevant to the presently claimed invention, or that any publication specifically or implicitly referenced is prior art.

Many people enjoy playing games on and otherwise utilizing gaming and entertainment consoles, such as Microsoft's Xbox®, Sony's Play Station 3®, Nintendo Wii®, and the like. Hereinafter, these and all related gaming and/or entertainment consoles are referred to as a "gaming console" or "game console." As known, gaming consoles are configured to receive a game or entertainment source, typically an optical disc (e.g., a CD or DVD), Digital File Transfer, or Streamed Digital Content from another device, and allow the user to play and/or watch the game, movie or other entertainment material on the game console. Most game consoles are adapted to play specially configured games that take advantage of the visual and audio aspects of the particular game console. In addition, most game consoles are also configured to play standard movies, music and other entertainment materials that are available on CDs, DVDs, Blue Ray® discs, Digital Content, and the like.

The most commonly utilized game consoles are also configured to allow the user to connect to the Internet, a local area network (LAN), or wide area network (WAN) through a wired or wireless connection, directly or indirectly, so he or she may transmit and receive data, particularly gaming data, with other persons or websites. In one use, the person playing a game on his or her game console can communicate with others, whether located nearby or in a different country, to play games with or against.

Game consoles are typically sold as a unit that includes the console, one or more game playing devices (commonly referred to as "controllers"), and various wires and cables that are needed to operate the game console. Although required to utilize the game console and to play games on and/or watch movies therewith, game consoles are generally not sold with any video or audio playing devices. Instead, a person wanting to utilize the game console must connect it to a television, monitor, or other video device on which the game or movie will be displayed. This is also true for the audio portion of the game console; the person utilizing the game console must feed the audio signal through the video device, such as a television or monitor having speakers attached thereto, connect the game console to one or more external speakers (which is usually preferred by many persons who play games or watch movies), or utilize another audio device to hear the audio portion of the game or movie.

Although having to provide and connect the game console to separate video and audio devices in order to utilize the game console may be seen as a disadvantage to some, most people who utilize game consoles prefer such an arrangement so they can connect to video and audio devices of their own choosing, typically selecting the best quality of video and audio devices he or she can afford. One limitation that results from not having video and audio devices fixedly associated with the game console is that playing games or watching movies on the game console requires the user to connect to available and appropriately configured video and audio devices. This limits the portability of game consoles and sharply contrasts their use with laptop and similar portable computing devices, which have a fixedly attached monitor and speakers.

As well known in the art, many people who play games on game consoles are very serious and competitive with their game play. These people are commonly referred to as "gamers." With regard to gamers, although they can play games on the game consoles by themselves (i.e., competing against the game itself), most prefer to compete against other players while the other players are playing the same game. One way to compete against other players is to play the game over the Internet with other players at their own game consoles controlling their own game (but competing against the other player(s)). Another way to compete against other players is for the gamers to physically get together in the same room and utilize the same game console and the same video and audio devices connected to the jointly utilized multi-game console configuration. The advantage of playing games over the Internet or other network is that each player has his or her own video and audio devices.

Game consoles also support multiple player sessions with a single game console. To facilitate getting together for competitive play, virtually all game consoles have multiple connection ports for multiple controllers, which ports are configured to feed multiple input signals into the game, and the games playable on the game consoles are configured to allow information (e.g., object movement and other control) from each of the multiple controllers. Game consoles may also facilitate joint play by multiple players in the same room by dividing the visual display into multiple or split screens, one screen section for each person, that allows each person to see and control his or her own game play. Most gamers, however, consider the use of split screens to have several important limitations, namely a much smaller visual display of their play (because the screen is split) and the visual distraction which results from having the other player's screens adjacent their own screen. The smaller visual display generally makes it much more difficult for the player to see the graphics provided by the game, which are usually quite extensive and sophisticated (in fact, represent much of the value of the game console and games), and substantially reduces the player's enjoyment of the game.

Another problem with split screens is that they allow one player to see the screens of his or her competitors, thereby allowing each player to view the movements or other action in a manner that reduces competitive play by eliminating the element of surprise or advantage of personal strategy. The various limitations of presently available multiple player game play with split screens could be avoided if each person brought his or her own game console with their own video and audio devices (e.g., a television or monitor with speakers) to the location where the players are getting together to play. This would require each person to transport their television, monitor or other video device to the game location, connect their game console to the video device and setup the game console (i.e., connect the controller and cables).

Generally, however, such requirements are impractical and, as a result, very rarely do players get together in this manner. In fact, most serious gamers utilize video devices that are rather large, somewhat heavy and/or bulky and expensive, making their movement even more impractical. Even when sized such that they would be relatively easy to move, generally there is no practical manner to move the video device with the game console in a manner that reduces the likelihood of damaging the video device and/or game console.

SUMMARY

The present invention discloses a portable system (or "environment") for allowing a gamer and other game console players to easily, safely and conveniently move a game console and its associated video and audio devices from one location to another. The environment of the present invention provides an easily transportable, customized case design that houses a game console and a video device in a manner that protects this equipment while being moved and played.

One or more embodiments of the portable gaming and entertainment environment generally comprise a portable case with an integrated high definition display & speakers designed for the mobile gamer to carry their gaming consoles, such as an Xbox 360®, Xbox 360 Slim®, or Play Station 3 Slim®. On-board storage is also provided for carrying game controllers, AC adaptors, cables for the game console, and several games. The portable case is designed to withstand minor incidental impacts during travel and complies with airline carry-on luggage requirements.

In one embodiment, the transportable case includes a lower base portion that allows for easy access to the front and rear features and audio/video inputs of a game console and, as a result, does not restrict airflow to the game console. As can be appreciated, an appreciable amount of airflow is required to maintain an acceptable temperature during use. As such, the portable case allows for substantially full access to both the front and rear portions of the game console without hindering or damaging the game console, cabling or peripherals while connected during play. In this embodiment, the transportable case also houses one or more audio devices, game controllers, games or movies, and the various wires and/or cables necessary to utilize the game console for playing games or watching movies. In this regard, the portable gaming and entertainment environment of the present invention allows the user to play games or watch movies on his or her game console at virtually any desired location including another room within a specific location with a minimum amount of onsite configuration and/or setup required.

In one embodiment, the environment is configured to allow the user to play against the game console or to connect the game console to the Internet or to a network environment so he or she may communicate with and compete against other players on their own game console environments, whether the others are located in the same room or in different location from his or her specific location. In some embodiments, the portable gaming and entertainment environment comprises one or more custom game console inserts operative to secure the game console within the case. The case may also define various compartments for storing and protecting a game console and components used with the game console, a monitor, and one or more speakers.

The customized inserts for a base define a game console compartment or "stage." The game console compartment has a custom support surface that receives and protects the game console during transportation. In one or more embodiments, the support surface is a unique insert, designed to specially fit the footprint of a supported game console. In some embodiments, the case also includes one or more removable containers for storing wires, cables and other peripheral items (e.g., headphones, controllers, or the like).

A hinge at the back side of the case may be utilized to interconnect the base and a lid and to pivot the lid relative to the base. The case may comprise one or more handles for ease in transporting the case from one location to another. In some embodiments, the case includes a fixed handle on one side. The case may also comprise a locking mechanism, such as one or more case latches, for locking the case in its closed position. The mounting mechanism may comprise an integrated loop latch passing through the case latches.

The environment of the present invention provides a much safer and easier means for a gamer to utilize a game console in a "community" or network environment with friends and/or family who may be competing against him or her at a game. With the environment of the present invention, the gamers will not need to share a television or monitor or be hindered by a single location to utilize a specific video device or by utilizing split screen technology, which results in small screens placed side-by-side. Instead, with the environment described herein, the gamers will each have their own full screen monitor environment. In addition to gamers, the environment of the present invention will allow businesses to provide an all inclusive gaming and multimedia unit for entertaining customers, employees and others in an easy to store package that can be freely moved. If desired, the environment could be modified to include a keyboard and other computer functionality. If desired, the environment could also be utilized for non-gaming or entertainment purposes, such as a training environment to present media and/or marketing.

Accordingly, an aspect of some embodiments of the present invention is to provide a portable gaming and entertainment environment that has the advantages discussed above and which overcomes the disadvantages and limitations associated with presently available environments for transporting and playing games and/or movies on a game console or providing a personal gaming and entertainment portable environment and the like. It is also an aspect of some embodiments to offer a desirable viewing angle and access to all the inputs of a gaming console. It is also an aspect of some embodiments to maximize game console port access, and allow substantial airflow around the game consoles. It is also an aspect of some embodiments to protect the game console vendor warranty by using the game console's power cord and plugging the game console directly into an electrical outlet and not an internal power source onboard the gaming and entertainment environment.

It is also an aspect of some embodiments to provide a portable gaming and entertainment environment that allows the user to play games or watch movies on his or her game console at virtually any location with a minimum amount of onsite configuration and/or setup. It is also an aspect of some embodiments to provide a portable gaming and entertainment environment that is configured to allow the user to connect the game console to the Internet or in a multiconsole configuration to a network environment so he or she may compete against other players utilizing their game console environment no matter where those players are located locally within the same location or globally external to his or her location. It is also an aspect of some embodiments to provide a portable gaming and entertainment environment that generally comprises an easily transportable case which safely and conveniently houses a game console, video device (e.g., a monitor), one or more audio devices, game controllers, one or more game or movie disks, and the various gaming peripherals, wires and/or cables necessary to utilize the game console for playing games or watching movies, all in a manner that protects these components while being transported, stored, and operated.

DETAILED DESCRIPTION

Figure 1:
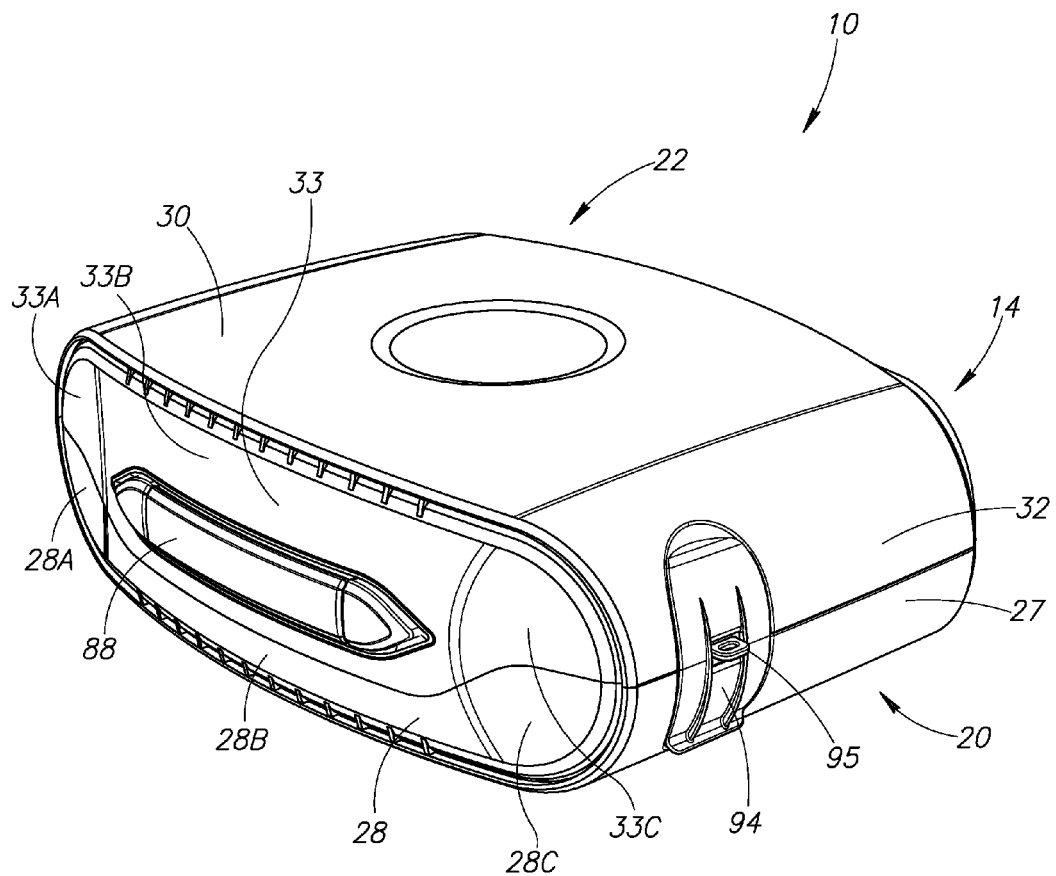
FIG. 1 is a perspective view of a portable gaming and entertainment environment when in a closed position.

With reference to the figures where like elements have been given like numerical designations to facilitate the reader's understanding, embodiments of the present invention are set forth below. The enclosed text and drawings are merely illustrative of one the embodiments and, as such, disclose one or more different ways of configuring the present invention. Although specific components, materials, configurations and uses are illustrated, it should be understood that a number of variations to the components and to the configuration of those components described herein and in the accompanying figures can be made without changing the scope and function of the invention set forth herein. For instance, although the figures and description provided herein show a certain game console and configurations for the components utilized with the game console, those skilled in the art will readily understand that this is merely for purposes of simplifying the present disclosure and that the present invention is not so limited.

A portable gaming and entertainment environment (or system) 10 that is configured pursuant to one embodiment is shown in the figures. The environment 10 generally comprises a game console 12 disposed inside a case 14 which also houses a video device 16 (e.g., a monitor) and one or more audio devices 18 (e.g., speakers integrated with the monitor).

The case 14 comprises a lower section or base 20 which houses the game console 12 and an upper section or lid 22 that houses the video device 16 and audio devices 18. As set forth above, the game console 12 can be any one of various commercially available game consoles, including Microsoft's Xbox 360® and Xbox 360 Slim®, Sony's Play Station 3® and Slim Line®, and others. Although game consoles typically allow multiple players with split screens, most gamers and other players do not particularly like playing with split screens due to the small view available on the screens, visual/audio interference from the play of other players, cheating that results from seeing other player's screens, and other issues. Presently, gamers are usually hindered in getting together in a single room or like environment to play against each other with their own video and audio devices due to the difficulty and impracticability of transporting all of the required components to the meeting place and concerns with damaging one or more of the components, particularly the video device (e.g., a TV, monitor or the like).

In addition, it is also known that it is generally impractical to have sufficient game playing resources (e.g., TVs, monitors, speakers, and the like) available at the meeting place so the gamers do not have to transport their own components. As set forth in more detail below, the environment 10 allows gamers and others to easily, safely and conveniently transport their game console, monitor, speakers and other components to any location, including a meeting place where they can play against the game console or other gamers by using the online or network gaming capabilities of the game console. In addition, the environment 10 allows a user to transport the game console 12 and related components to any location where he or she may want to play games and/or watch movies, with or without joining others.

Figure 2:
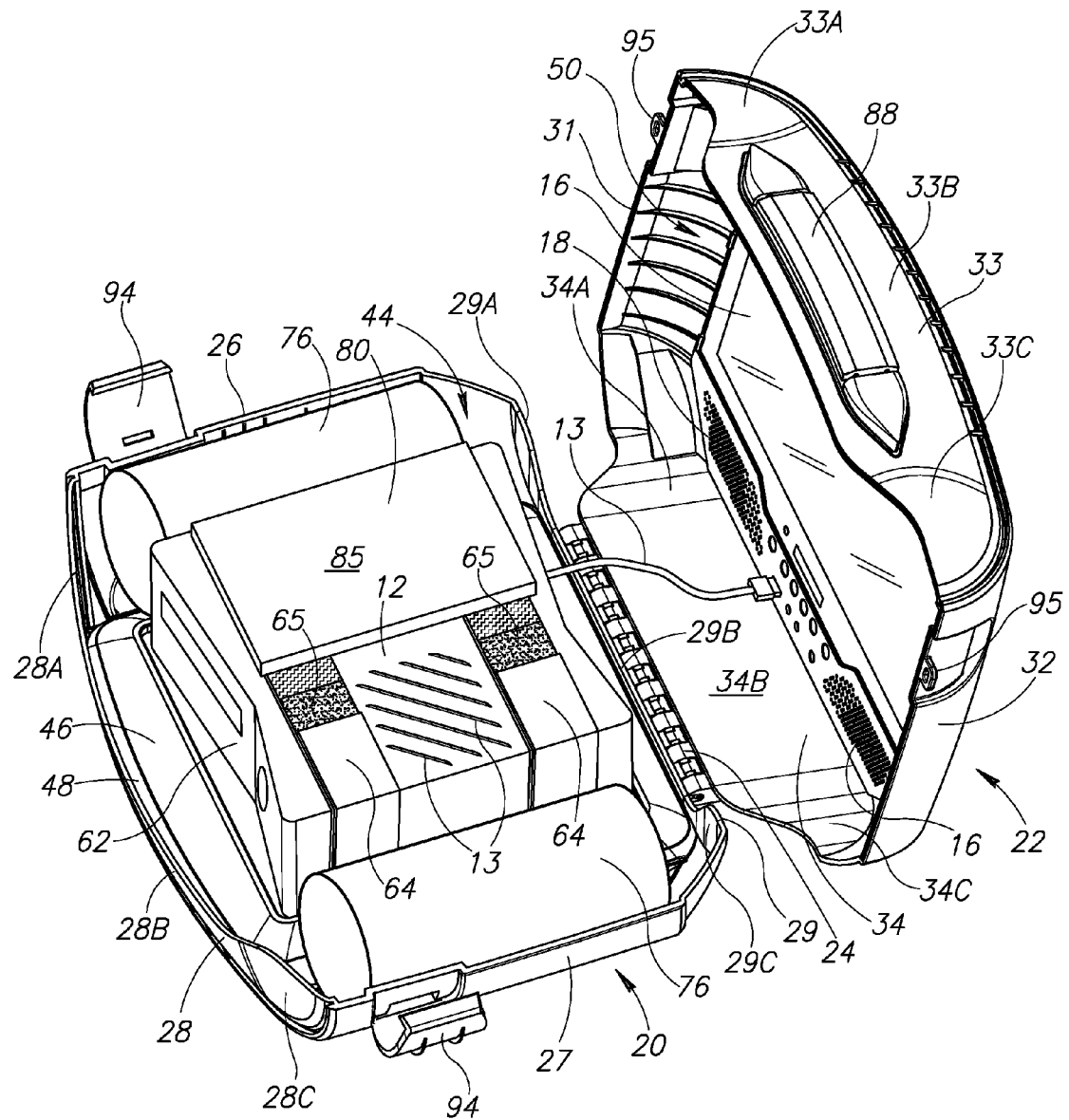
FIG. 2 is a perspective view of the portable gaming and entertainment environment of FIG. 1 when in an opened position.

As shown in FIG. 2, the lid 22 of the case 14 is hingedly connected to the base 20 by a hinge 24, and the design and placement of the hinge is such that a user may move the case 14 between a closed position (as shown in FIG. 1) and an opened position (as shown in FIG. 2) without causing the case to tip due to uneven distribution of weight, with or without a game console installed within the case. The viewing angle of the case lid 22 (and therefore the video device 16) offers a desirable viewing angle during use. For example, the viewing angle may be greater than 90 degrees, preferably between 100 degrees and 110 degrees (e.g., 105 degrees), measured relative to a horizontal surface on which the base 20 rests (see FIG. 5B). The positioning of the hinge 24 is described below.

As shown in FIG. 1, the base 20 of the case 14 has a front 28 comprising a left portion 28A, a center portion 28B, and a right portion 28C. The center portion 28B is substantially lower in height than the left portion 28A and the right portion 28C. The base 20 also includes a back 29 (see FIGS.

2 and 4) comprising a left portion 29A, a center portion 29B, and a right portion 29C. Further, the base 20 comprises a first or left end 26 (see FIG. 2), a second or right end 27, and a bottom 25 (see FIG. 4). Similarly, the lid 22 of the case 14 has a front 33 comprising a left portion 33A, a center portion 33B, and a right portion 33C. The lid 22 also includes a back 34 comprising a left portion 34A, a center portion 34B, and a right portion 34C. Further, the lid 22 comprises a first or left end 31 (see FIG. 2), a second or right end 32, and a top 30 (see FIG. 1).

Figure 6A:
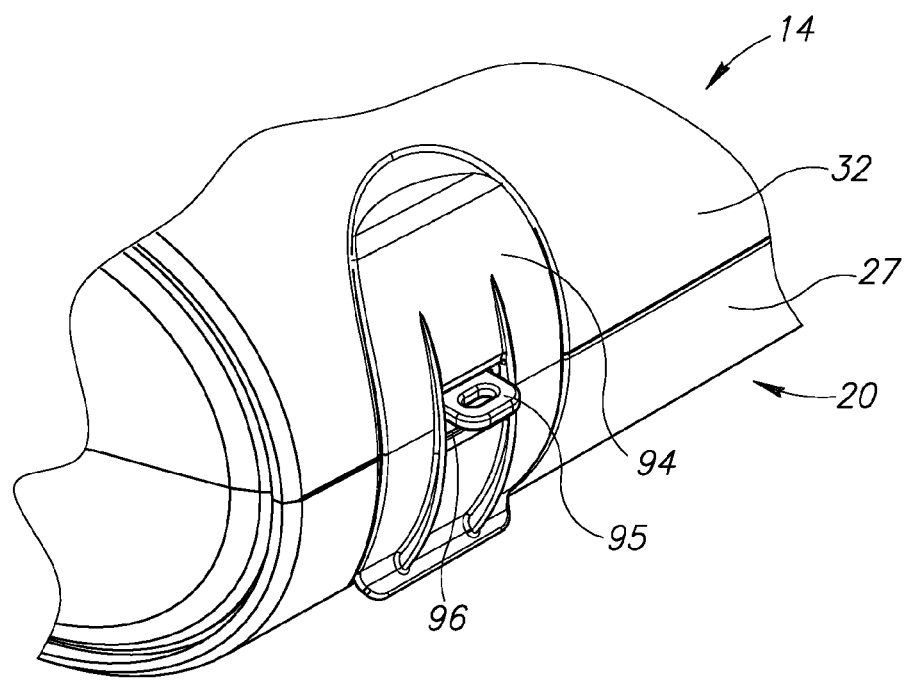
FIG. 6A is a perspective view of a latch of the portable gaming and entertainment environment of FIG. 1 when the latch is in a closed position.
Figure 6B:
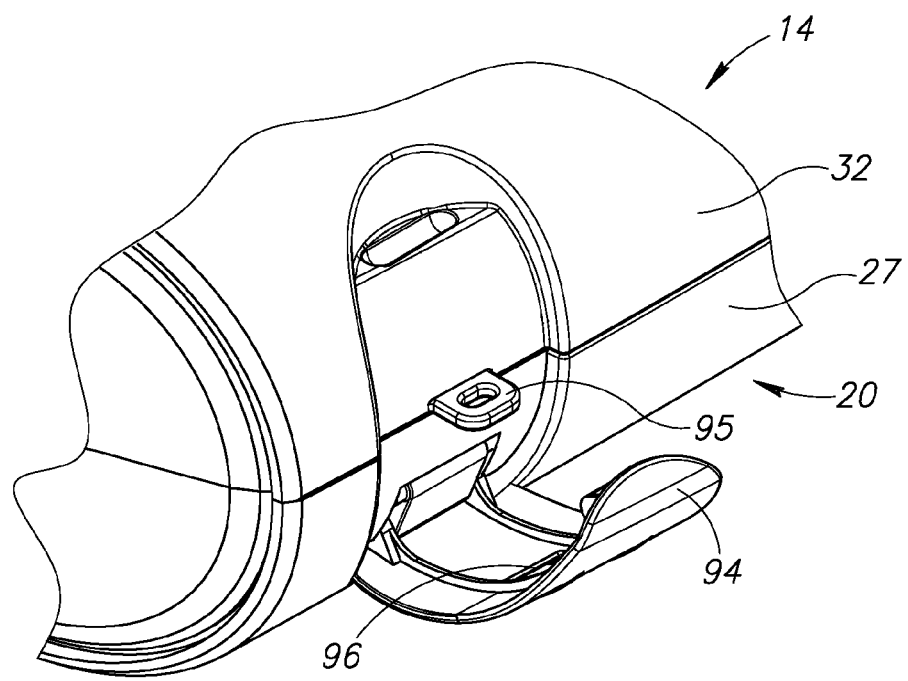
FIG. 6B is a perspective view of the latch of the portable gaming and entertainment environment of FIG. 1 when the latch is in an opened position.

When in the closed position shown in FIG. 1, the base 20 and the lid 22 of the case 14 define an inner chamber in which may be disposed the game console 12, display device 16, audio devices 18, and other components necessary or desired to play games or to watch movies with the game console so that these components may be easily, safely and conveniently moved from one location to another. The case 14 may be secured in the closed position by any suitable locking means which may comprise one or more latches, such as the pair of latches 94 shown best in FIG. 6A (closed position) and FIG. 6B (opened position). The latch 94 comprises an aperture 96 sized to permit a staple or ring 95 coupled to the lid 22 to pass therethrough when the latch is in the closed position. As can be appreciated, a user may attach a lock (e.g., a padlock) to the ring 95 to selectively lock the case in the closed position. The locking means generally should be of the type that securely locks the lid 22 and base 20 together so the user will not have to be concerned with accidental opening of the case 14 during movement thereof.

As will be appreciated, the case 14 may be made out of a wide variety of materials, including aluminum, plastic, carbon fiber or other metals, various plastic or composite materials, and other "soft materials," which are commonly used for cases. In some embodiments, the case 14 is made out of a relatively sturdy material that is selected for its durability, toughness and being of a reasonable weight so the case can protect the game console 12, video device 16, audio devices 18, and other components inside the case and, preferably, results in a environment 10 that does not weigh so much that it is difficult for a person to move.

Figure 4:
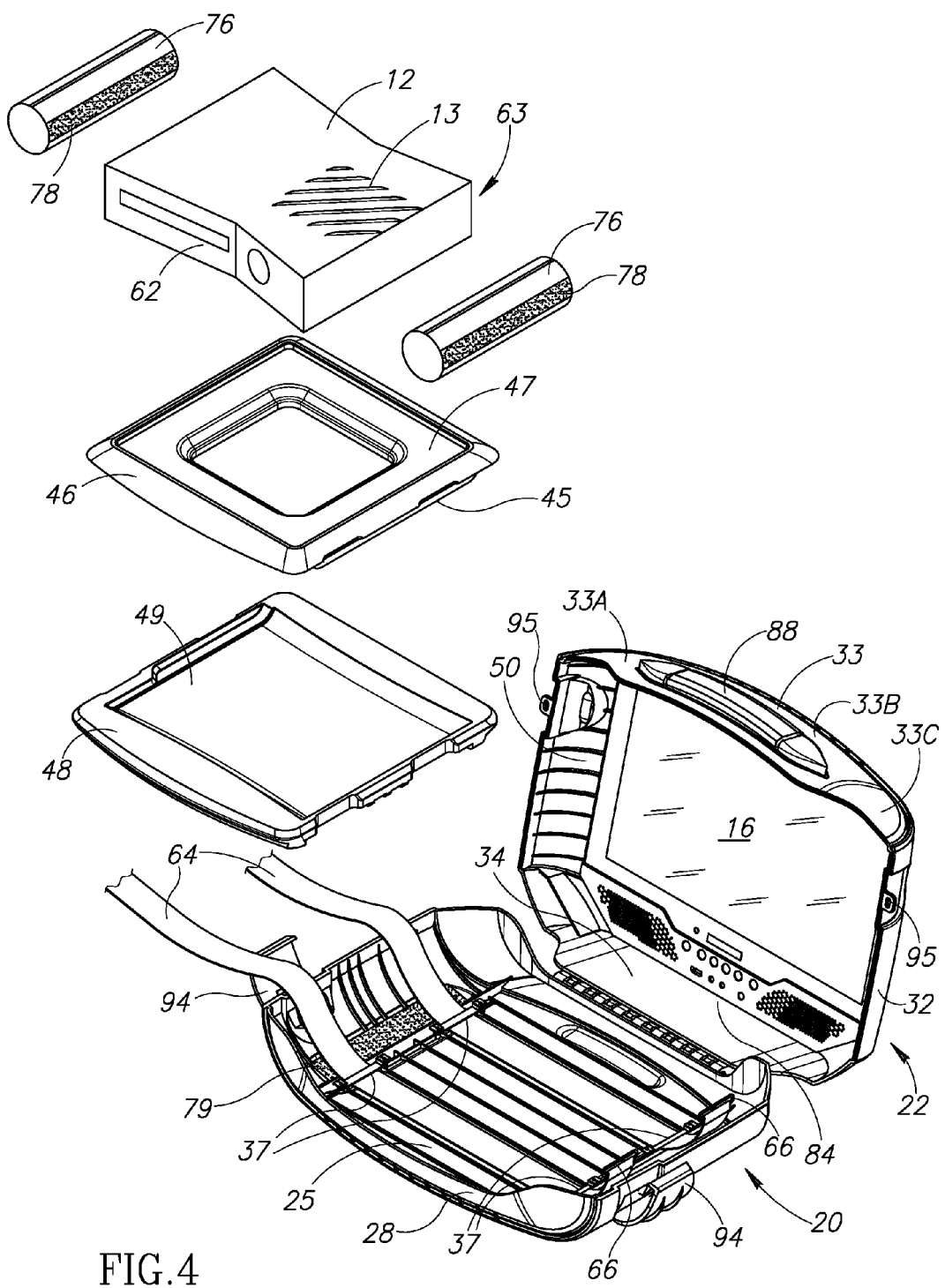
FIG. 4 is an exploded perspective view of the portable gaming and entertainment environment of FIG. 1 when in the opened position.
Figure 9:
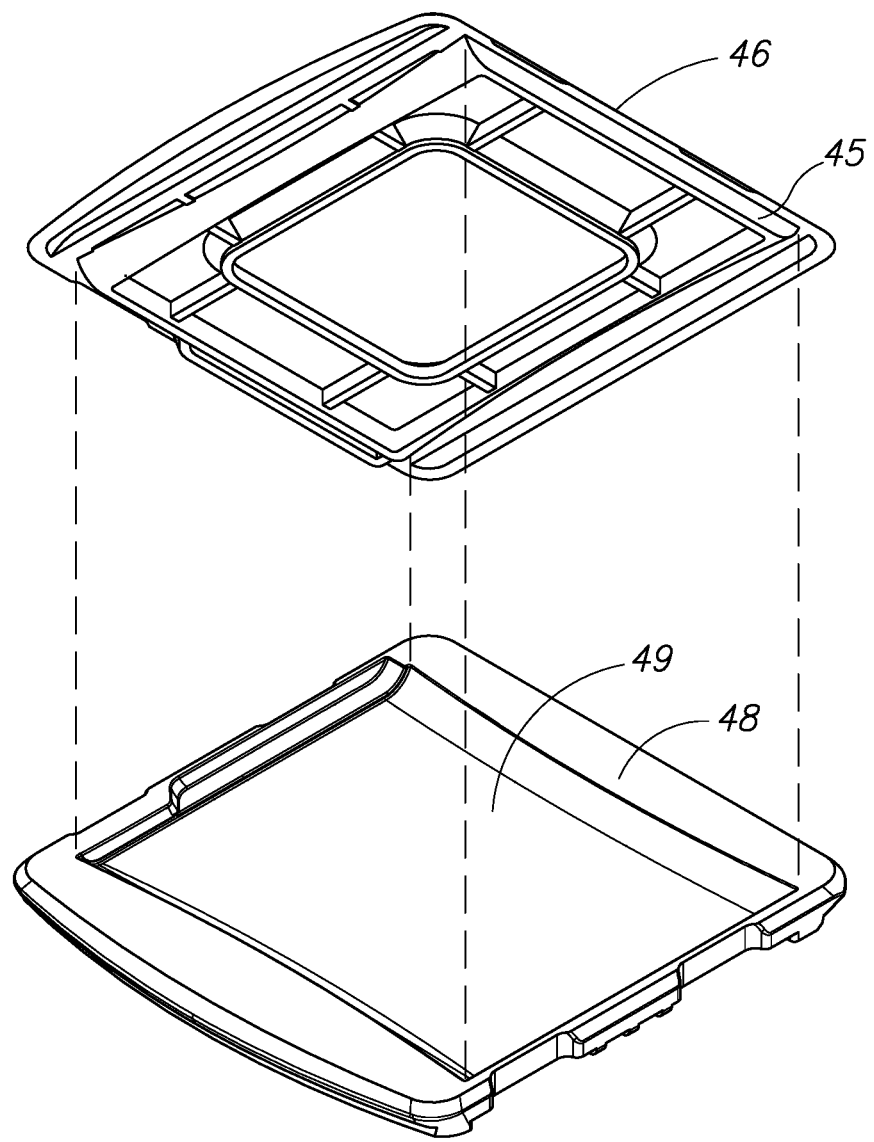
FIG. 9 is a perspective view of custom inserts of the portable gaming and entertainment environment of FIG. 1.
Figure 10A:
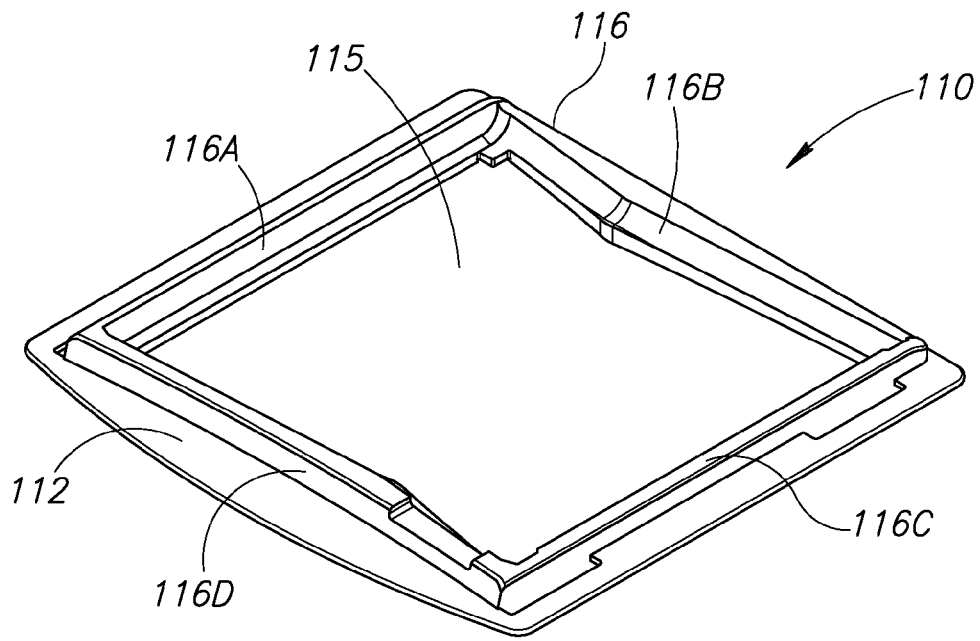
FIG. 10A is a perspective view of a top surface of a reversible insert of the portable gaming and entertainment environment of FIG. 1.
Figure 10B:
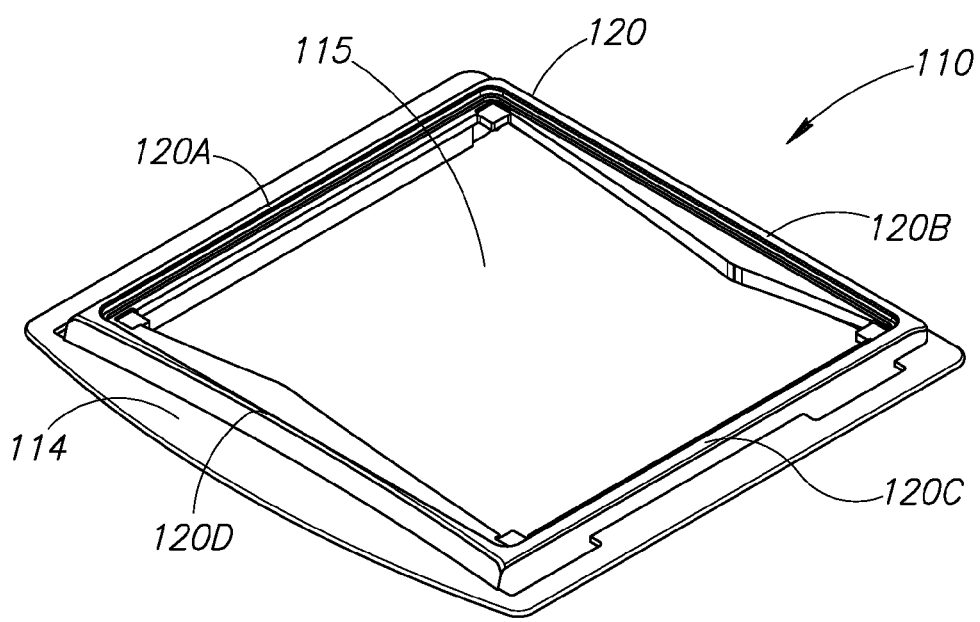
FIG. 10B is a perspective view of a bottom surface of the reversible insert of the portable gaming and entertainment environment of FIG. 1.

The interior of the case 14 may have a plurality of compartments and/or mounting apparatuses that receive and secure the game console 12, video device 18, audio devices 16 and other components that are utilized with the game console. As best shown in FIGS. 2, 4, and 9, the case 14 includes an upper custom insert 46 that defines a first console compartment (or "stage") 47 with a recess and a lower custom insert 48 that defines a second console compartment or stage 49 with a recess. The custom inserts 46 and 48 may be removably attachable to the case 14. The second console compartment 49 of the lower custom insert 48, with the upper custom insert 46 removed, is sized to snuggly receive a game console having a first size or "footprint" (e.g., an XBOX 360). As shown best in FIG. 9, the upper custom insert 46 includes a lower portion 45 that is sized to be snuggly received within the recess of the second console compartment 49 such that the upper custom insert 46 is stackable on top of the lower custom insert 48. The first console compartment 47 of the upper custom insert 46 is sized to snuggly receive a game console having a second size or "footprint" different than the first size (e.g., an XBOX 360 Slim and PS3 Slim Line with a smaller footprint than an XBOX 360). In this regard, a user may use one or both custom inserts 46 and 48 depending on the type of game console that is to be used with the environment 10. It should be appreciated that other removable or fixed custom inserts may also be provided (or purchased separately) to accommodate a variety of game consoles. For example, another embodiment for a custom insert is shown in FIGS. 10A and 10B and described hereinbelow.

In some embodiments of the environment 10, the game console 12 is removably received in the upper or lower console compartments 47 and 49 so the user thereof can take it out of the case 14 and attach it to a standard (e.g., generally non-movable) television, display, or other video device at his or her home or other location for playing games or watching movies using the game console.

Advantageously, the console compartments 47 and 49 have a shallow depth relative to the game console 12, such that the compartments do not surround or "cover" any appreciable portion of the sides of the game console when located therein. This design provides a sufficient amount of air circulation to satisfy the "breathing" requirements of the game console, which prevents overheating. Further, the design allows for full access to inputs of the game console 12, such as various cable ports, power ports, and game disk receiving ports.

The design of the base 20 provides the advantages of access to the game console 12 and sufficient airflow. As may best be viewed in FIGS. 2 and 4, the center portions 28B and 34B of the front 28 and back 34, respectively, of the base 20 have a relatively low height, less than one half the overall height of the case when in the closed position of FIG. 1. This is in contrast to a case that has a base having a front that is substantially one half the overall height of the case. This feature provides the user with access to a front face 62 and a rear face 63 of the game console 12. Further, this feature permits air to flow freely near the front face 62 and the rear face 63 of the game console 12.

The environment 10 may include one or more game console securing means, such as the two straps 64 shown in FIGS. 2, 4, 7, and 8, that are utilized to secure the game console 12 to the custom insert 46 (or the custom insert 48 if the custom insert 46 is not used) and the base 20 to better protect the game console during movement of case 14. The straps 64 or other securing means may be configured to aid, in conjunction with the custom inserts 46 and 48, in buffering shock to the game console 12 in the event the case 14 is dropped or similarly jarred.

As best shown in FIG. 4, the straps 64 may be secured to the base 20 by threading each of the straps through rigid loops 37 fixedly attached to the bottom 25 of the base 20. The straps 64 may each include a rectangular ring 66 on one end which allows the straps to be passed under the bottom of the inserts 46 and 48 (from right to left in the view of FIG. 4), back over the top of the game console 12 (left to right), threaded through the ring 66, and folded back onto themselves and thereby secured using loop fasteners 65 positioned on the straps 64 that are configured to removably couple with corresponding hook fasteners (not shown) on the end portions of the straps 64.

In some embodiments, the video device 16 (and audio devices 18) may be fixedly or removably mounted to the lid 22 of the case 14 by suitable mounting means (not shown) configured to securely and safely mount the video device and audio devices. As can be appreciated, various sizes and types of monitors can be utilized as the video device 16 of the environment 10. As an example, monitors having a diagonal size of 15.5 inches, 17 inches, 19 inches, or the like, may be utilized, dependent on the particular design. In conjunction with the video device 16, a thin clear panel may be fixedly or removably mounted in a manner to protect display face of the video device 16 from standard impacts thereto. Preferably, the video device 16 is selected to provide HDTV or like video for the games and/or movies and audio signals from the game console 12. The mounting means may be configured to allow a user to remove the video device 16 from the lid 22 so that he or she may replace, repair or upgrade the video device 16 as desired or necessary.

In some embodiments, the hinge 24 (see FIG. 2) may be of the type that allows the user to selectively adjust the viewing angle of the video device 16 by fixedly adjusting the angle of the lid 22. In this regard, the hinge 24 may be designed to have sufficient resistance to hold the weight of the lid 22 at a desired angle (e.g., similar to laptop computers, and the like).

The environment 10 may also include removable containers 76 that are configured to store cables, controllers and other gaming related objects which are utilized with the game console 12. To removably secure the removable containers 76 to the bottom 25 of the base 20, hook and loop fasteners 78 and 79 may be fixedly coupled to the containers 76 and to the bottom 25, respectively.

Figure 7:
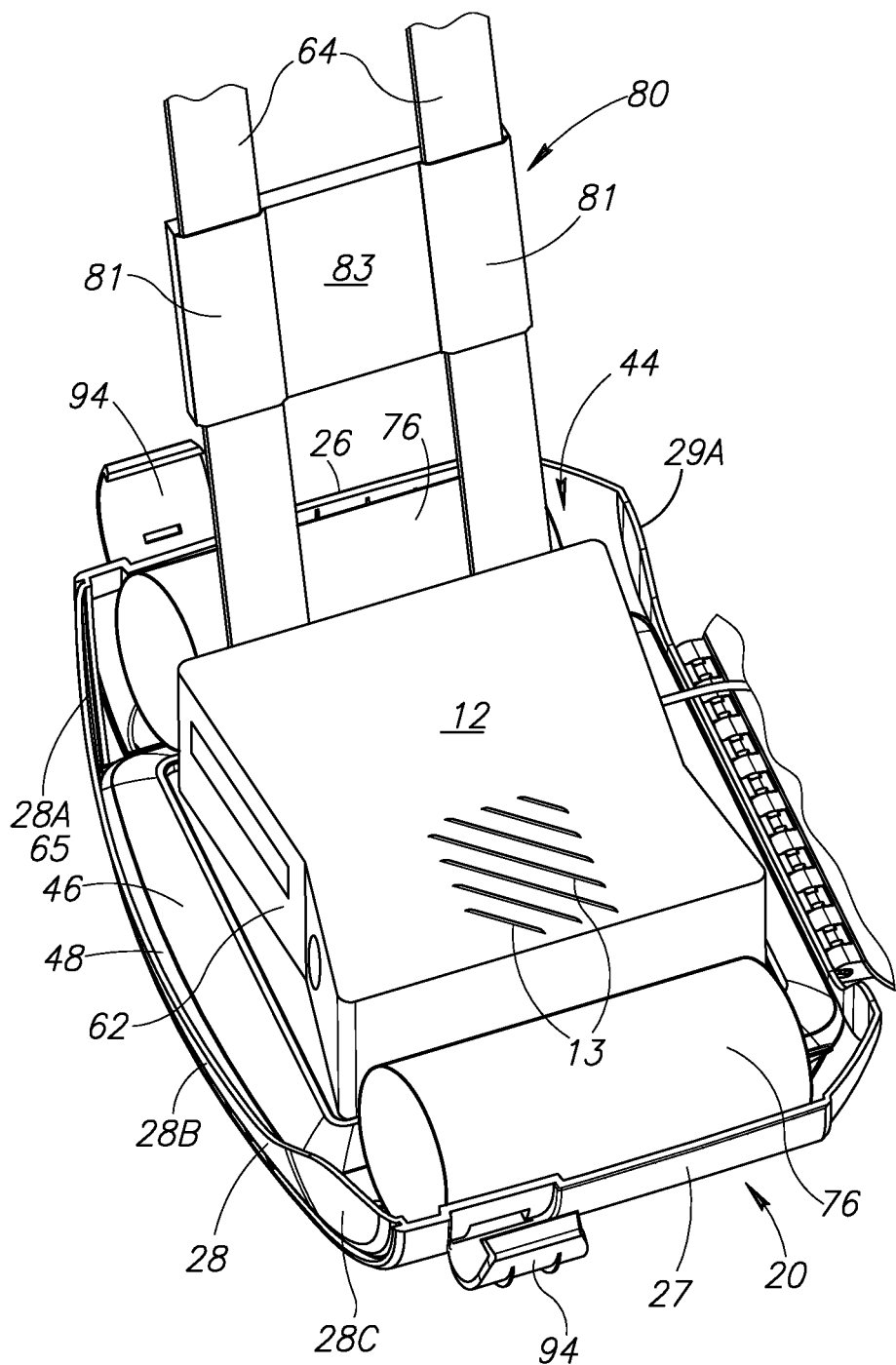
FIG. 7 is a perspective view of the portable gaming and entertainment environment of FIG. 1 that illustrates a configuration for a game container.

As shown in FIGS. 2 and 7, a game container 80 may also be provided that is configured to receive and store one or more game disks. In this embodiment, the game container 80 is configured to be removably coupled to the straps 64 at a position whereat the game container 80 does not cover vents 13 of the game console 12, so that the airflow of the game console is not restricted. As shown in FIG. 7, the game container 80 includes bottom surface 83 opposite a top surface 85 (see FIG. 2) that includes two strap securing portions 81 that each form a loop or aperture sized to permit one of the straps 64 to freely pass therethrough. Thus, a user may simply pass each of the straps 64 through a corresponding one of the strap securing portions 81 to secure the game container 80 to the case 14.

Figure 8:
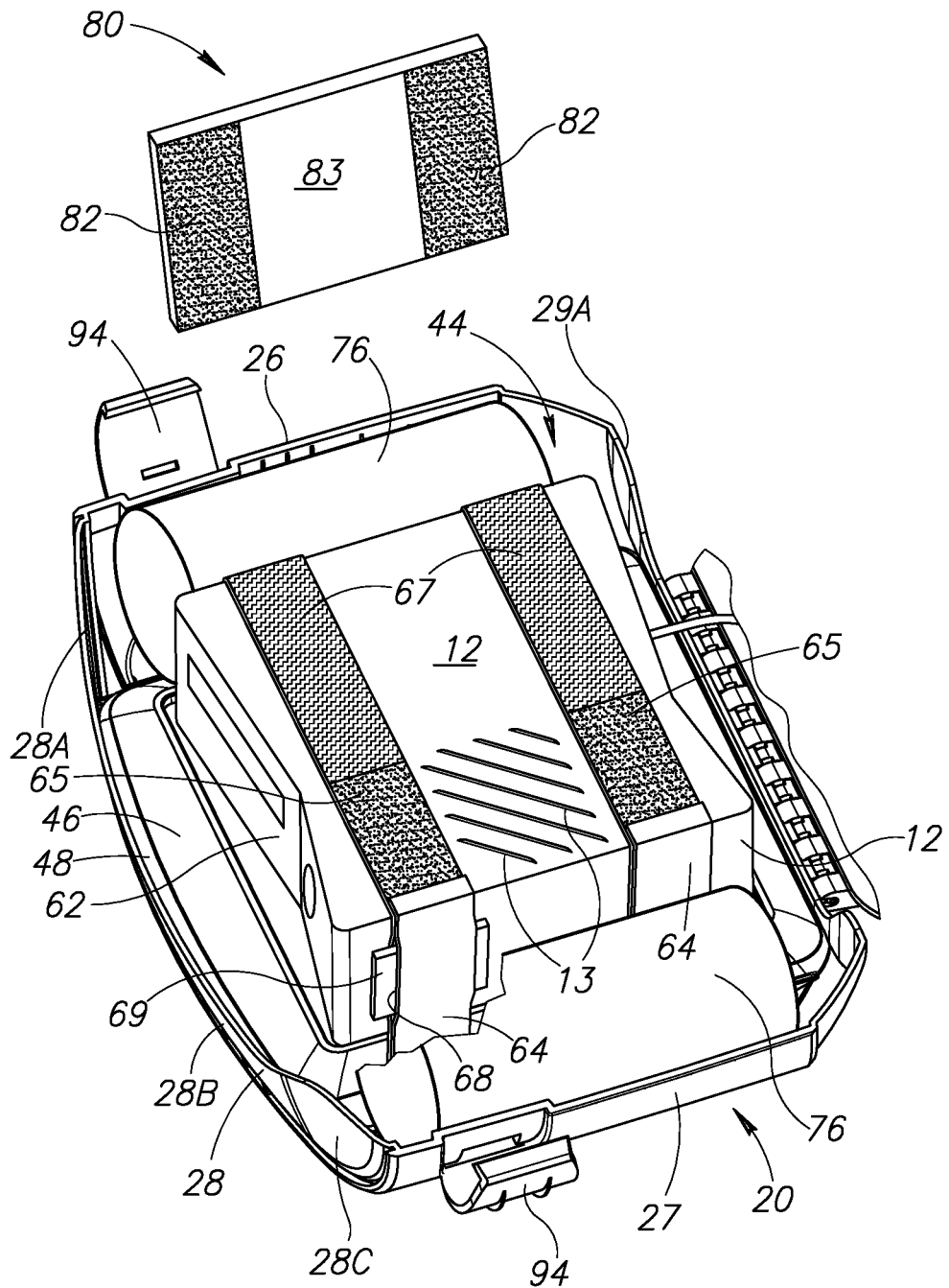
FIG. 8 is a perspective view of the portable gaming and entertainment environment of FIG. 1 that illustrates another configuration for a game container.

FIG. 8 illustrates another embodiment for the game container 80 and the straps 64. In this embodiment, the straps 64 include hook fasteners portions 67 in addition to the loop fasteners portions 65. The bottom surface 82 of the game container 80 includes loop fasteners portions 82 that are configured to be removably coupled to the corresponding hook fasteners portions 67 of the straps 64. Advantageously, the positioning of the hook fasteners portions 67 and the loop fasteners portions 65 of the straps 64 is such that the game container 80 may be removably coupled to the straps 64 only at a position above the game console 12 whereat the game container 80 does not cover the vent 13 of the game console. It should be appreciated that the hook fasteners portions and the loop fasteners portions of the game container 80 and the straps 64 may be reversed and still provide the same desirable function of preventing a user from attaching the game container to the straps at a position over the vent 13.

As shown in FIG. 8, in some embodiments the straps 64 may be configured to include an aperture or pocket 68 sized to receive a remote control 69. The remote control 69 may be operative to control the operation of the video device 16, audio devices 18, and/or the game console 12. Although the pocket 68 is shown, it will be appreciated that other suitable mechanisms for removably fastening a remote control to any portion of the straps 64 or other portion of the case 14 may be used.

Operation of the video device 16 (and the audio devices 18) are controlled by an audio/video (A/V) panel 84 that contains a variety of audio, visual, and power ports that can be utilized with the game console 12 in the case 14. For instance, the A/V panel 84 can comprise one or more headphone jacks that are utilized by the gamer while playing a game or movie on the game console 12 to avoid noise for persons around him or her who are not playing or to prevent the game play audio from other gamers from interfering with his or her play. The A/V panel 84 may also include a power port configured to receive power from an AC adapter to provide power to the video device 16. The A/V panel 84 also includes an A/V port (e.g., an HDMI port) to receive an HDMI cable 13 of the game console 12. The A/V panel 84 may also include component ports and other A/V formats that can be utilized to connect the game console 12 and other peripheral devices to the video device 16. A wide variety of ports or connection devices may be utilized with the A/V panel 84 to provide increased functionality for the environment 10. In addition to the various ports, the A/V panel 84 may also include an interface to adjust various properties of the video device 16 and audio devices 18 connected thereto, such as contrast, brightness, volume, menu options, and the like.

Figure 5A:
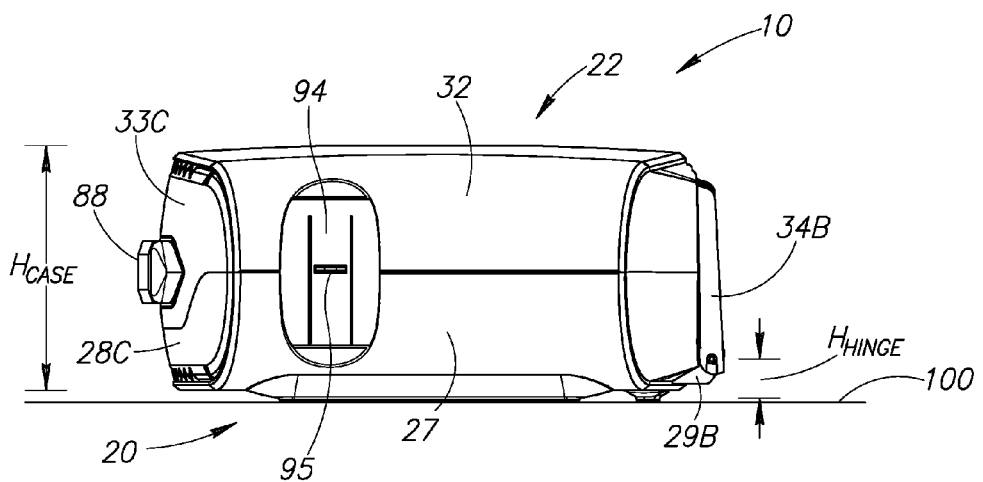
FIG. 5A is a right side elevational view of the portable gaming and entertainment environment of FIG. 1 when in the closed position.
Figure 5B:
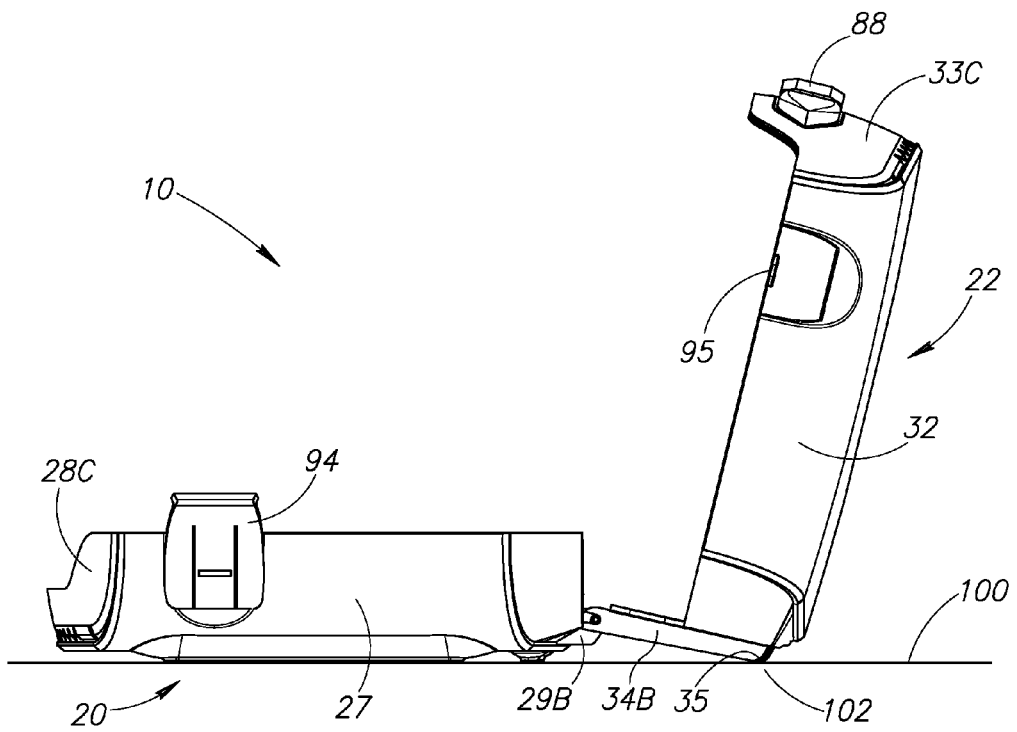
FIG. 5B is a right side elevational view of the portable gaming and entertainment environment of FIG. 1 when in the opened position.

As may best be viewed in FIGS. 5A and 5B, the case 14 is configured such that the lid 22 may be moved from the closed position (see FIG. 5A) to the opened position (see FIG. 5B), wherein a contact portion 35 of the lid 22 rests on a surface 100 (e.g., a table) upon which the base 20 is positioned at a contact point 102 of the surface. A shown in FIGS. 2 and 5A, the hinge 24 is coupled to the center portion 29B of the base 20 and to the center portion 34B of the lid 22. Each of the center portions 29B and 34B are sized so that the hinge 24 has a relatively low height ($H_{HINGE}$) compared to the overall height of the case 14 ($H_{CASE}$), as indicated in FIG. 5A. This is in contrast to a case that might have a base and a lid with similarly sized hinge attachment portions which would position the hinge at about half the height of the case. The positioning of the hinge 24 permits the lid 22 (and the video device 16) to be fixed at an angle which provides a user with a desirable viewing angle of the video device 16. For example, the viewing angle may be greater than 90 degrees, preferably between 100 degrees and 110 degrees (e.g., 105 degrees), or the like. Further, the positioning of the hinge 24 provides a relatively balanced weight distribution for the case 14 when in the opened position, so that the case 14 will not tip over rearwardly regardless of whether the game console 12 or other components are positioned inside the base 20. To further protect the case 14 from tipping over, the hinge 24 includes a stop that prevents the lid 22 from over-rotating past a predetermined angle. For example, the stop of the hinge 24 may prevent the lid 22 from rotating more than the aforementioned desired viewing angle.

Figure 3:
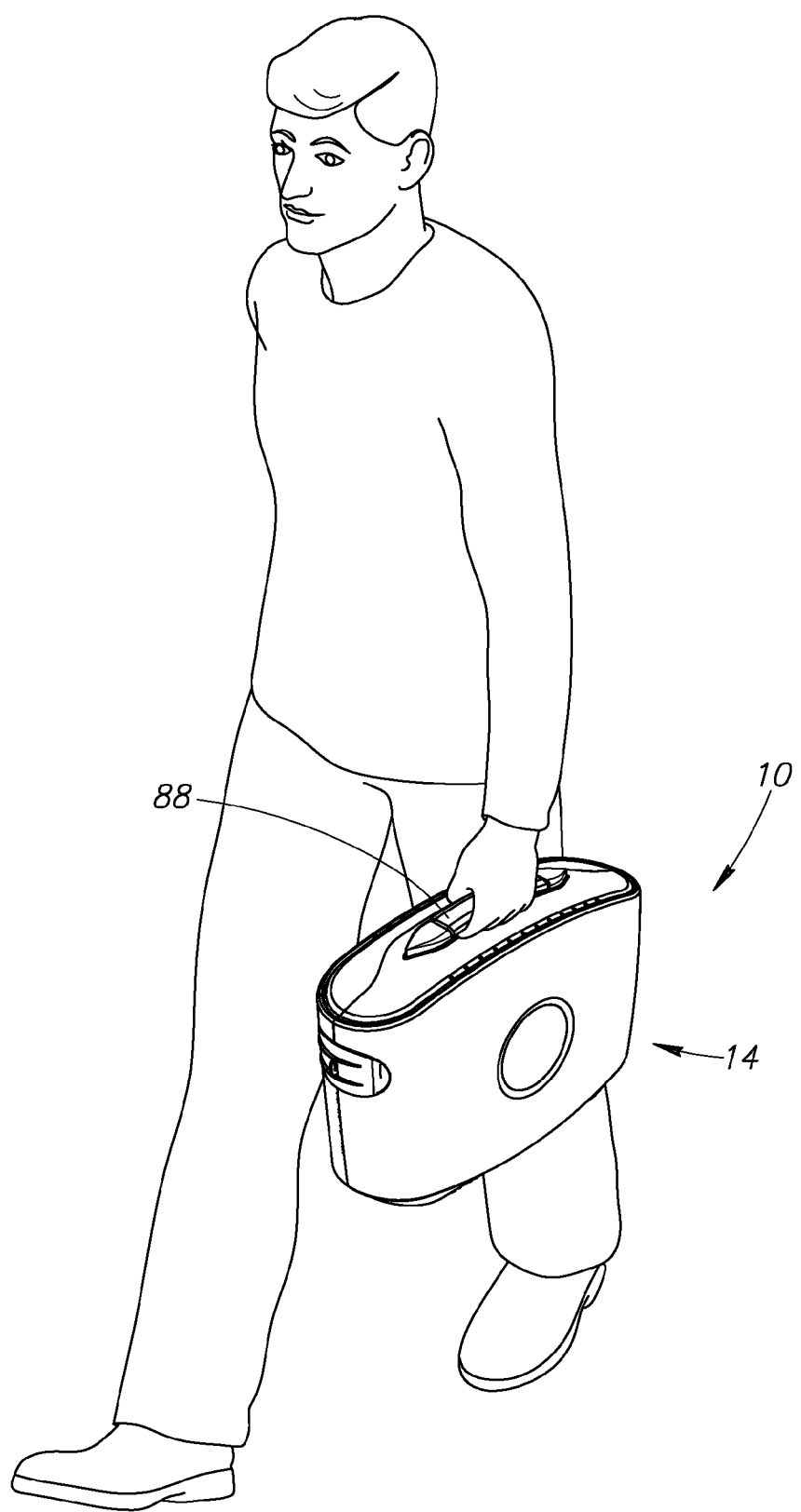
FIG. 3 illustrates the portable gaming and entertainment environment of FIG. 1 being carried by a user.

In various environments, the case 14 may include a variety of handles, wheels and latches that improve the transportability thereof. For example, in the embodiment shown in the figures, the case 14 has a fixed handle 88 disposed on the center portion 33B of the front 33 of the lid 22. The fixed handle 88 is shown during use in FIG. 3, and may be of the type that is commonly utilized with briefcases, luggage and other carrying devices that facilitate the user holding and transporting the case 14 with a single hand. The fixed handle 88 is generally configured to allow the user to move case when in its closed position.

In various embodiments, the video device 16 may be pivotally attached to the lid 22 of the case 14 utilizing a pivoting mounting bracket (not shown) coupled to the top 30 of the lid 22. The mounting bracket may be configured to allow the user to tilt the video device 16 as necessary to obtain the best or preferred viewing angle when case 14 is in its open position, as shown in FIGS. 2 and 5B, and to lower the video device 16 down towards the game console 12 to place the case 14 in its closed position, shown in FIG. 1.

Various modifications can be made to the environment 10 of the present invention. For instance, the various game console compartments 47 and 49 defined by the custom inserts 46 and 48, respectively, inside the case 14 can be modified to be different sizes and shapes than those shown in the figures. In this regard, the console compartments 47 and 49 may be configured to receive and protect different sizes and configurations of game consoles. In some embodiments, the console compartments 47 and 49 are adjustable in size to fit different models of game consoles so that a single model of the case 14 can fit a variety of game consoles 12.

FIGS. 10A and 10B illustrate perspective views a reversible custom insert 110. FIG. 10A shows the reversible custom insert 110 when a first or top surface 112 is facing upward, and FIG. 10B shows the reversible custom insert when a second or bottom surface 114, opposite the top surface, is facing upward. The reversible custom insert 110 is configured to be received within the base 20 of the case 14, similar to the custom insert 48 shown in FIGS. 2 and 4 and described hereinabove. The reversible custom insert 110 may be insertable within the base 20 by itself, or may be stackable with another insert as described with regard to the custom inserts 46 and 48.

As shown in FIG. 10A, the reversible custom insert 110 includes a first frame 116 protruding upwardly from the top surface 112. The first frame 116 includes four sides 116A, 116B, 116C, and 116D surrounding a hollow interior 115 that form a first recess or "stage" shaped and sized to snuggly receive a bottom portion of a first game console having a first size or "footprint" (e.g., an XBOX 360). As shown in FIG. 10B, the reversible custom insert 110 also includes a second frame 120 protruding upwardly from the bottom surface 114. The second frame 120 includes four sides 120A, 120B, 120C, and 120D surrounding the hollow interior 115 that form a second stage shaped and sized to snuggly receive a bottom portion of a game console having a second size or "footprint" different than the first size (e.g., an XBOX 360 Slim and PS3 Slim Line with a smaller footprint than an XBOX 360). In this regard, a user may utilize the reversible insert 110 with either the first surface 112 facing upward or the second surface 114 facing upward, depending on the type of game console that is to be used with the environment 10. Advantageously, this embodiment permits multiple types of game consoles to be accommodated using the single reversible custom insert 110.

If desired, the audio devices 18 can be located in the base 20 instead of or in addition to being located in the lid 22 and integrated into the video device 16. If located in the base 20, the audio devices 18 can be pivotally mounted therein so the user can tilt them forward toward him or her when playing a game or movie on the game console 12 to better direct the sound to him or her. The base 20 and the lid 22 may have access doors or ports that allow the user to access various portions of the case 14, such as the bottom 25 of base 20 below game console 12 and/or the top 30 of the lid 22 behind the video device 16 and audio devices 18, as may be necessary for or desired by the user of environment 10.

If the game console 12 does not have Wi-Fi or other Internet or networking capability, the necessary equipment to connect to the Internet or other networks may be included in the case 14 so the user can access the Internet or join others on a network for competitive play.

In use, the case 14 will typically be supplied to the user without the game console 12 so that he or she may utilize his or her own game console 12 and upgrade or replace it as desired. The case 14 can be supplied with the video device 16 and/or the audio devices 18 already installed or the user can also supply these components.

When the user desires to move his or her game console 12 to a different location for single or group play, he or she places the game console in the console compartment 47 of the custom insert 46 (or the console compartment 49 of the custom insert 48 if the custom insert 46 is not used) with the console face 62 facing toward the front 28 of the base 20, and secures the game console to the base 20 with the straps 64 and/or other securing means. The controllers and various wires/cables may be placed in the removable containers 76 and the games disks, which may be Game Disks, CDs, DVDs, Blue Ray or the like having a game or movie thereon, may be placed in the game container 80.

Once loaded, the user may pivot the lid 22 downward against the base 20 and engage the locking means, such as latches 94, to lock the case 14 in its closed position. The user then can move the case 14, having all of the components therein, by using the fixed handle 88 or the like to carry the case. When the user gets to his or her desired location, he or she only has to disengage the latches 94, fold up the lid 22 to the resting position (see FIG. 5B) or to the desired viewing angle to view video device 16, attach a power cord to a power port of the A/V panel 84 (if not already connected), plug the power cord into an outlet, connect the controllers and any other necessary wires/cables for the game console, and turn on all the powered components such as the game console and video device. The user will then have his or her own game console, video device and audio speakers to play the game or watch a movie or listen to music without requiring any additional equipment.

Various embodiments of the invention are described above in the detailed description. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s).

The foregoing description of various embodiments of the invention known to the applicant at the time of filing the application has been presented and is intended for the purposes of illustration and description. The present description is not intended to be exhaustive nor limit the invention to the precise form disclosed and many modifications and variations are possible in the light of the above teachings. The embodiments described serve to explain the principles of the invention and its practical application and to enable others skilled in the art to utilize the invention in various embodiments and with various modifications as are suited to the particular use contemplated. Therefore, it is intended that the invention not be limited to the particular embodiments disclosed for carrying out the invention.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.).

The invention claimed is:

1. A portable gaming and entertainment system for use with a supported game console, the portable gaming and entertainment system comprising:
a case having a base and a lid pivotally attached to each other by a hinge such that the lid may be rotated between a closed position wherein the base and lid together form an inner chamber, and an opened position,
the base comprising a bottom side, a front side, a back side, a left side, and a right side, together forming a lower portion of the inner chamber, the front side, the back side, the left side, and the right side of the base extending upward and away from the bottom side, the back side of the base having a recessed portion recessing downward toward the bottom side to a shortest edge that extends laterally along a base back side center portion, the shortest edge having a height less than a height of the left side and the right side of the base,
the lid comprising a top side, a front side, a back side, a left side, and a right side, together forming an upper portion of the inner chamber, the front side, the back side, the left side, and the right side of the lid extending downward and away from the top side, the back side of the lid having a projecting portion projecting downward from the top side to a tallest edge that extends laterally along a lid back side center portion, the tallest edge of the projecting portion having a height greater than a height of the left side and the right side of the lid, and
wherein the hinge directly connects the recessed portion to the projecting portion, the hinge is positioned on a back side of the case, and the recessed portion and the projecting portion are relatively proportioned to space the hinge apart from the bottom side of the base at a distance that is less than half of a total height of the case when the lid is in the closed position, wherein a distance between the top side of the lid and the bottom side of the base when the lid is in the closed position defines the total height of the case,
a console storage area disposed on an interior-facing side of the bottom side of the base, the console storage area configured to receive the game console;
a display device coupled to an interior-facing side of the top side of the lid such that a user may view the display device when the lid is in the opened position, wherein the display device is positioned on the upper portion of the inner chamber, and the projecting portion and recessed portion being relatively proportioned to position a display surface of the display device at a desired viewing angle relative to the bottom surface of the base when the lid is in the opened position; and
a video port operative to permit the display device to be operatively coupled to the game console.

2. The system of claim 1, further comprising:
a first custom insert removably disposed on the console storage area and defining a first console compartment configured to removably receive a lower portion of the game console thereon, the first console compartment being further configured to protect the game console from movement while providing access to a front face and a rear face of the game console, the front side and the back side of the base being configured to provide unobstructed access to ports positioned on the front face and the rear face, respectively, of the game console when the game console is positioned within the first console compartment of the first custom insert.

3. The system of claim 1, wherein the front side of the base comprises a left portion, a right portion, and a base front side center portion, the base front side center portion being substantially lower in height than the left portion of the base and the right portion of the base to provide unobstructed access over the base front side center portion to ports positioned on a front face of the game console when the game console is positioned within the console storage area.

4. The system of claim 1, wherein the back side of the base comprises a left portion, a right portion, and the base back side center portion, the base back side center portion of the base being substantially lower in height than the left portion of the base and the right portion of the base to provide unobstructed access over the base back side center portion to ports positioned on a rear face of the game console when the game console is positioned within the console storage area.

5. The system of claim 1, further comprising an audio/video panel coupled to the interior-facing side of the top side of the lid and including one or more audio or video input ports configured for coupling with one or more audio or video output ports of the game console.

6. The system of claim 1, wherein the back side of the base comprises a left portion, a right portion, and the base back side center portion, the base back side center portion being substantially lower in height than the left portion of the base and the right portion of the base to provide unobstructed access over the base back side center portion to ports positioned on a rear face of the game console when the game console is positioned within the console storage area, the back side of the lid comprises a left portion, a right portion, and the lid back side center portion, wherein the hinge is positioned to couple an upper portion of the base back side center portion with a lower portion of the lid back side center portion at a height that is less than half of the total height of the case measured when the case is resting on the base.

7. The system of claim 1, wherein the hinge is configured to support the lid so as to dispose display surface of the display device to face the front side of the base when the lid is in the closed position, and position the lid tilted rearward at an angle greater than 90 degrees relative to a horizontal plane when the lid is in the opened position for viewing of the display device.

8. The system of claim 1, wherein the display device is at least partially spaced apart from the back side of the base along a horizontal plane when the lid is in the opened position and tilted rearward at an angle equal to greater than 90 degrees relative to the horizontal plane.

9. The system of claim 1, further comprising a handle coupled to the case and configured to allow a user to carry the case when the lid is in the closed position.

10. The system of claim 1, wherein at least one of the left side of the base and the right side of the base being spaced apart from the console storage area and forming an accessory storage area sized and shaped to store accessory components related to the game console or display device, the system further comprising a removable container sized and shaped to store the accessory components and to fit in the accessory storage area, the left side of the base and at least one of the right side of the base being configured to support the container.

11. The system of claim 1, further comprising a speaker configured to operatively couple with the game console.

12. The system of claim 11, wherein the speaker is mounted to the interior-facing side of the lid for movement therewith.

13. The system of claim 1, wherein the case further comprises a lock for selectively locking the case when the lid is in the closed position.

14. The system of claim 1, further comprising a first adjustable strap and a second adjustable strap attached to the base of the case, the first adjustable strap and the second adjustable strap each including hook and loop fasteners to selectively secure the game console to the case.

15. The system of claim 14, wherein the first strap and the second strap are spaced apart from each other at a fixed distance in a direction from the front side of the base to the back side of the base.

16. The system of claim 1, wherein the display device includes an integrated audio output device.

17. The system of claim 1, wherein the front side of the base has a second recessed portion recessing downward toward the bottom side to a second shortest edge that extends laterally along a base front side center portion, the second shortest edge having a height less than the height of the left side and the right side of the base,
    wherein the front side of the lid has a second projecting portion projecting downward from the top side to a second tallest edge that extends laterally along a lid front side center portion, the second tallest edge of the projecting portion having a height greater than the height of the left side and the right side of the lid, and
    wherein the second projecting portion and the second recessed portion interlock together when the lid is in the closed position.

18. A portable gaming and entertainment system for use with a supported game console one of a first size or a second size smaller than the first size, the portable gaming and entertainment system comprising:
    a case having a base and a lid pivotally attached to each other by a hinge such that the lid may be rotated between a closed position wherein the base and the lid together form a substantially enclosed inner chamber, and an opened position,
    the base comprising a front side, a back side, a left side, a right side, and a bottom side together forming a lower portion of the inner chamber, the front side, the back side, the left side, and the right side of the base extending upward and away from the bottom side, the back side of the base having a recessed portion recessing downward toward the bottom side to a shortest edge that extends laterally along a base back side center portion, the shortest edge having a height less than a height of the left side and the right side of the base,
    the lid comprising a top side, a front side, a back side, a left side, and a right side, together forming an upper portion of the inner chamber, the front side, the back side, the left side, and the right side of the lid extending downward and away from the top side, the back side of the lid having a projecting portion projecting downward from the top side to a tallest edge that extends laterally along a lid back side center portion, the tallest edge of the projecting portion having a height greater than a height of the left side and the right side of the lid,
    wherein the hinge directly connects the recessed portion to the projecting portion, the hinge is positioned on a back side of the case, and the recessed portion and the projecting portion are relatively proportioned to space the hinge apart from the bottom side of the base at a distance that is less than half of the total height of the case when the lid is in the closed position, wherein a distance between the top side of the lid and the bottom side of the base when the lid is in the closed position defines the total height of the case, and
    wherein, when the lid is in the closed position, respective perimeter portions of the base and the lid are substantially adjacent each other to form the inner chamber and so as to not allow any cables to pass between the inner chamber of the case and an exterior of the case to prevent the game console from being coupled to an external power source when the lid is in the closed position, thereby preventing the potential for damage to the gaming console due to the gaming console being powered on when the lid is in the closed position when there is insufficient air flow to properly cool the gaming console;
    a console storage area disposed on an interior-facing side of the bottom side of the base, the console storage area configured to receive the game console;
    an adjustable securing strap comprising a first portion including one of hook fasteners and loop fasteners and a second portion comprising the other of hook fasteners and loop fasteners, the first and second portions of the strap being removably coupled together;
    a display device coupled to the lid such that a user may view the display device when the lid is in the opened position, wherein the display device is positioned on the upper portion of the inner chamber, and the projecting portion and recessed portion being relatively proportioned to position a display surface of the display device at a desired viewing angle relative to the bottom surface of the base when the lid is in the open position; and
    a video port operative to permit the display device to be operatively coupled to the game console of the first or second size.

19. The system of claim 18, wherein the back side of the base comprises a left portion, a right portion, and the base back side center portion, the base back side center portion of the base being substantially lower in height than the left portion of the base and the right portion of the base to provide unobstructed access over the base back side center portion to ports positioned on a rear face of the game console when the game console is positioned within the console storage area.

20. A portable gaming and entertainment system for use with a supported game console, the portable gaming and entertainment system comprising:
    a case having a base and a lid pivotally attached to each other by a hinge such that the lid may be rotated between an open position and a closed position wherein the base and the lid together form a substantially enclosed inner chamber,
    the base comprising a bottom side, a front side, a back side, a left side, and a right side, together forming a lower portion of the inner chamber, the front side, the back side, the left side, and the right side of the base extending upward and away from the bottom side, the back side of the base having a recessed portion recessing downward toward the bottom side to a shortest edge that extends laterally along a base back side center portion, the shortest edge having a height less than a height of the left side and the right side of the base, the lid comprising a top side, a front side, a back side, a left side, and a right side, together forming an upper portion of the inner chamber, the front side, the back side, the left side, and the right side of the lid extending downward and away from the top side, the back side of the lid having a projecting portion projecting downward from the top side to a tallest edge that extends laterally along a lid back side center portion, the tallest edge of the projecting portion having a height greater than a height of the left side and the right side of the lid, and wherein the hinge directly connects the recessed portion to the projecting portion, the hinge is positioned on a back side of the case, and the recessed portion and the projecting portion are relatively proportioned to space the hinge apart from the bottom side of the base at a distance that is less than half of the total height of the case when the lid is in the closed position, wherein a distance between the top side of the lid and the bottom side of the base when the lid is in the closed position defines the total height of the case, wherein, when the lid is in the closed position, respective perimeter portions of the base and the lid are substantially adjacent each other so as to not allow any cables to pass between an interior of the case and an exterior of the case to prevent the game console from being coupled to an exterior power source when the lid is in the closed position, thereby preventing the potential for damage to the gaming console due to the gaming console being powered on when the lid is in the closed position when there is insufficient air flow to properly cool the gaming console;

a console storage area disposed on an interior-facing side of the bottom side of the base, the console storage area configured to receive the game console;

a display device positioned within the lid such that a user may view the display device when the lid is in the opened position, and the hinge includes a rotational stop that prevents a display surface of the display device from rotating beyond a predetermined viewing angle relative to the bottom surface of the base when the lid is in the open position; and a video port operative to permit the display device to be operatively coupled to the game console.

21. The system of claim 20, wherein the console storage area includes a recess sized to removably receive the game console therein, the console storage area being configured to provide access to a front face and a rear face of the game console.

22. The system of claim 20, wherein the back side of the base comprises a left portion, a right portion, and the base back side center portion, the base back side center portion of the base being substantially lower in height than the left portion of the base and the right portion of the base to provide unobstructed access over the base back side center portion to ports positioned on a rear face of the game console when the game console is positioned within the console storage area.

* * * * *